United States Patent [19]
Vargha et al.

[11] Patent Number: 6,127,882
[45] Date of Patent: Oct. 3, 2000

[54] CURRENT MONITORS WITH INDEPENDENTLY ADJUSTABLE DUAL LEVEL CURRENT THRESHOLDS

[75] Inventors: Douglas A. Vargha, Palo Alto; Bill Maney, Redwood City, both of Calif.

[73] Assignee: Maxim Integrated Products, Inc., Sunnyvale, Calif.

[21] Appl. No.: 09/256,030

[22] Filed: Feb. 23, 1999

[51] Int. Cl.[7] .............................. G05F 1/10; G05F 3/02
[52] U.S. Cl. .......................................................... 327/540
[58] Field of Search ................................... 327/312, 313, 327/143, 328, 427, 430, 434, 540; 361/101

[56] References Cited

U.S. PATENT DOCUMENTS

| | | | |
|---|---|---|---|
| 4,398,252 | 8/1983 | Frait ........................................ | 364/426 |
| 5,617,046 | 4/1997 | Palara et al. ............................ | 327/110 |
| 5,668,493 | 9/1997 | Nelson et al. .......................... | 327/309 |

OTHER PUBLICATIONS

Lenk, Ron, Current Limit Protects Power Bus, Dec. 18, 1997, p. 109, EDN Electrical Design News, Newton, MA.
McGoldrick, Paul, Controller IC Simplifies Hot–Swapping of Boards, Jun. 10, 1996, pp. 161–162, Electronic Design, Cleveland, OH.

In–Rush Current Limit MOSFET Driver, Apr. 5, 1999, p. 1–9, Vishay Siliconix.

Programmable Hot Swap Power Manager, Mar. 1999, p. 1–6, Unitrode.

*Primary Examiner*—Terry D. Cunningham
*Assistant Examiner*—Quan Tra
*Attorney, Agent, or Firm*—Blakely, Sokoloff, Taylor & Zafman LLP

[57] ABSTRACT

Current sensing circuits having independently adjustable dual-level trip thresholds for use in hot swap controllers, solid state circuit breakers and other current sensing circuits. The dual-level trip threshold is user-programmable to provide one current level for power-up conditions and another current level for normal operation. The two separate thresholds are also useful during normal operation to monitor both the steady state current and to set a limit on the upper current which should never be exceeded. Various features and alternate embodiments are disclosed.

39 Claims, 1 Drawing Sheet

CURRENT MONITORS WITH INDEPENDENTLY ADJUSTABLE DUAL LEVEL CURRENT THRESHOLDS

BACKGROUND OF THE INVENTION

1. Field of the Invention

The present invention relates to the field of current sensing and limiting circuits.

2. Prior Art

Current sensing and limiting circuits are commonly used in various systems for the protection of the circuit to which the current is being provided, the circuit which is providing the current, and/or for the protection of other circuits connected thereto. While the present invention is not limited to any specific use, the applications for which the preferred embodiment of the present invention is intended is what are commonly referred to as solid state circuit breaker, and hot swap applications wherein a printed circuit board is to be plugged into a system without turning off power to the system. Successful hot swapping in systems such as computer systems may allow the replacement of a faulty board or the addition of a new board without requiring interruption of the operation of the rest of the system and without the time delay of rebooting the system. However, successful hot swapping is not automatically achieved. In particular, the circuit on a printed circuit board to be plugged into an active system may have a substantial capacitance, the charging of which during the plug-in can cause a momentary drop in the supply voltage to cause one or more errors in the rest of the system. Further, it is common to add capacitance to the power supply lines within a printed circuit board, both to limit power supply noise generated by the circuits on the board from having a substantial effect on the power supply as seen by other boards in the system, and to limit the effect of power supply noise generated elsewhere in the system from effecting that particular board. Such additional capacitance frequently is substantially greater than that of the circuits themselves.

In other situations, such as in the case of inductive loads or incandescent lamps, inrush currents typically will be many times the steady state currents for such circuits. Also, while normal operation of a circuit will have predefined, maximum current limits, extraordinary loads due to temporary or permanent circuit faults may be encountered. To avoid high current inrush problems and steady state current problems, current limiting circuits have been used wherein the in-rush of current on the sudden power-up of a printed circuit board (or other part of a system) caused by such occurrences as the plug-in of a board into an already activated circuit, and/or a fault condition, is purposely limited so that the effects on the power supply lines and power supply itself are limited. By way of example, Unitrode Corporation and Linear Technology Corporation both provide circuits for current limiting in such applications. These devices, however, do not have independently adjustable trip thresholds. The Unitrode devices provide a different trip threshold during start-up than during normal operation, but the difference is preset to be 1 amp greater during start-up than for normal operation. Linear Technology Corporation devices use an RC time constant at startup and ignore the current levels. Therefore both of these are a compromise between different considerations.

BRIEF SUMMARY OF THE INVENTION

Current sensing circuits having independently adjustable dual-level trip thresholds for use in hot swap controllers, solid state circuit breakers and other current sensing circuits. The dual-level trip threshold is user-programmable to provide one current level for power-up conditions and another current level for normal operation. The two separate thresholds are also useful during normal operation to monitor both the steady state current and to set a limit on the upper current which should never be exceeded. Various features and alternate embodiments are disclosed.

DETAILED DESCRIPTION OF THE INVENTION

Figure 1:
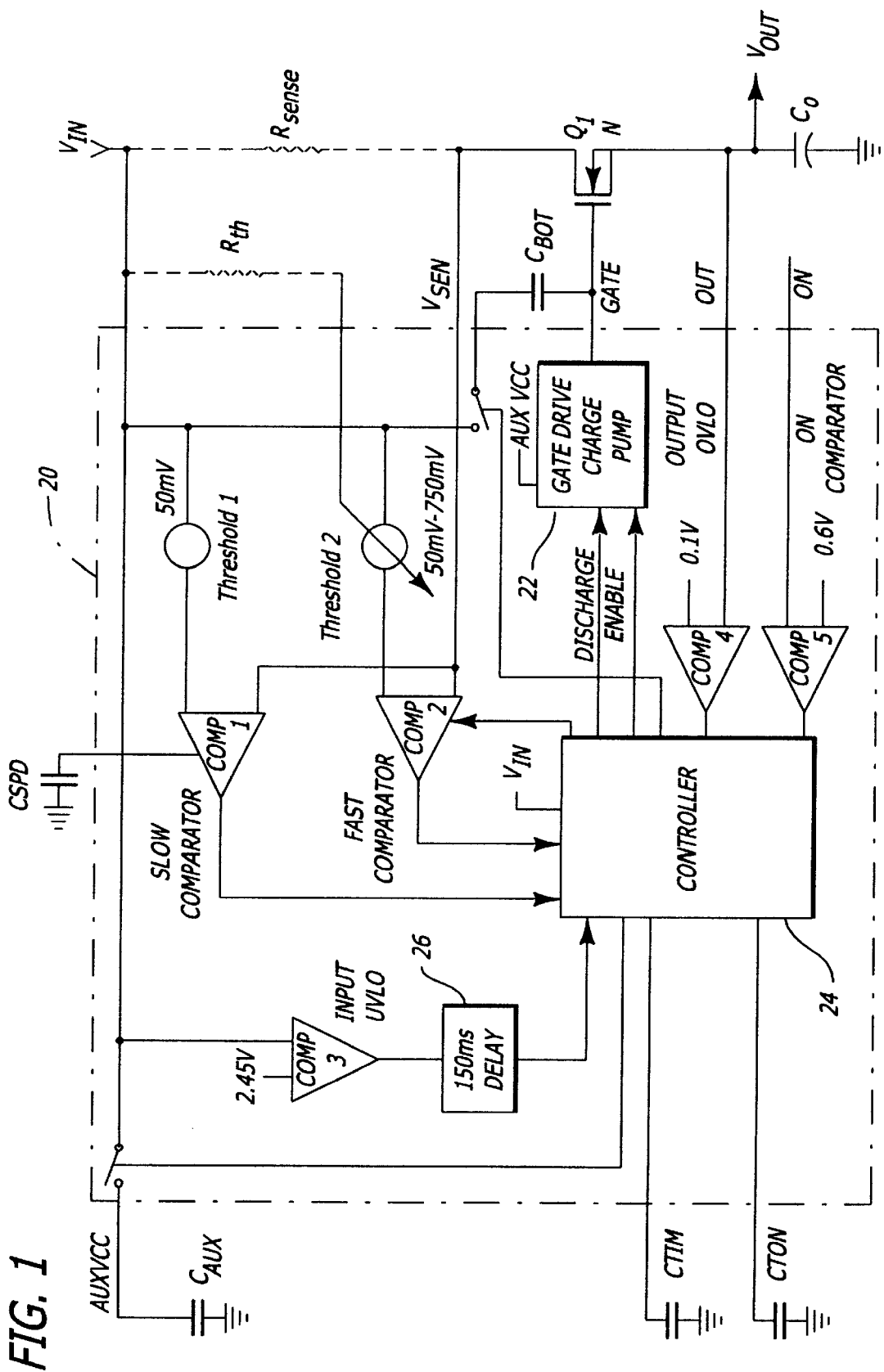
FIG. 1 is a block diagram of one embodiment of the present invention.

Referring to FIG. 1, a block diagram of the preferred embodiment of the present invention may be seen. In this block diagram, the dashed line 20 generally encloses elements of the diagram normally fabricated in integrated circuit form.

In FIG. 1, transistor Q1, an n-channel transistor specifically shown, provides the main power switch between the input $V_{in}$ and the output $V_{out}$. The sense resistor $R_{sense}$, in series with the drain of transistor Q1, is a relatively low value resistor, causing little voltage drop between the input $V_{in}$ and the output $V_{out}$ when the transistor switch Q1 is on and the circuit is under normal load, though still an adequate voltage drop to provide a measurable voltage there across proportional to the current through the resistor. Capacitor $C_0$, between the output $V_{out}$ and ground, is for ripple reduction purposes. This capacitor may be absent as a separate, discreet device, though is representative of the capacitance of one or more bypass capacitors and/or other capacitance associated with the circuit connected to the output $V_{out}$.

Other external components include the capacitor CBOT, resistors $R_{sense}$ and $R_{th}$, capacitors CSPD, CTIM and CTON, and auxiliary capacitor CAUX. The capacitor CAUX is a filtering or smoothing capacitor to provide a lower noise source voltage AUXVCC, used in the embodiment shown as a source of power for the gate discharge circuit which is embodied in the gate drive charge pump 22. The charge pump provides a gate drive for transistor Q1 above the voltage $V_{in}$ to drive transistor Q1 into a low resistance operating condition when the transistor is to be turned fully on. The actual gate drive itself is controlled by control circuit 24 which responds to various inputs to determine the appropriate gate drive under the then present conditions. Two of these inputs are the outputs of comparators COMP1 and COMP2. One of these comparators, COMP1, has as one input a fixed voltage or threshold below the input voltage $V_{in}$, referred to herein as Threshold 1, in the preferred embodiment 50 millivolts below the input voltage $V_{in}$. The second input to comparator COMP1 is a voltage VSEN at the node between resistor $R_{sense}$ and the drain of transistor Q1, the voltage at that node being equal to $V_{in}-IR_{sense}$, where I is the current through resistor $R_{sense}$ and transistor Q1. By selecting the value of resistor $R_{sense}$, the current level through resistor $R_{sense}$ and transistor Q1 for which the output of the comparator COMP1 will change may be adjusted as desired without changing, and more particularly without increasing, the voltage drop across resistor $R_{sense}$, at which the output of the comparator COMP1 will change. Thus, the output current (the current through resistor $R_{sense}$ and transistor Q1) at which the output of comparator COMP1 will change is equal to $0.050/R_{sense}$.

External capacitor CSPD is used to set the response time of comparator COMP1 so that the same will not be triggered by high frequency components or transients in the current through resistor $R_{sense}$. Typically, the response time will be set, by way of example, to something on the order of 20 microseconds or more.

Comparator COMP2 is similarly responsive to the difference between a threshold voltage and the voltage VSEN across resistor $R_{sense}$, though in this case the threshold voltage, Threshold 2, is adjustable by the external resistor $R_{th}$. In the preferred embodiment, Threshold 2 is adjustable between 50 millivolts and 750 millivolts. In this example, at the lower end, comparator COMP2 and comparator COMP1 will change outputs at the same level of current through resistor $R_{sense}$, though when Threshold 2 is set to the upper limit of its range in the preferred embodiment, comparator COMP2 will not change states until the current through resistor $R_{sense}$ is 15 times that required to cause comparator COMP1 to change states.

In the preferred embodiment, the circuitry determining Threshold 2 provides a 2 μamp current through the resistor $R_{th}$, so that Threshold 2 will be $2*R_{th}*10^{-6}$ volts, or 50 millivolts for $R_{th}$=25 Kohm and 750 millivolts for $R_{th}$=375 Kohm. The actual current detection level of COMP2 is $2*R_{th}/R_{sense}*10^{-6}$ amps. Obviously other threshold circuits and different ways of sensing current levels will be apparent to those skilled in the art.

The control circuit 24 also responds to the output of comparator COMP3 as delayed by delay 26, in the preferred embodiment, a delay of approximately 150 milliseconds. Comparator COMP3 senses the input voltage $V_{in}$ and compares the same to a reference voltage, in the preferred embodiment, approximately 2.45 volts. The combination of comparator COMP3 and the delay 26 provide a start-up signal to the control circuit 24, the comparator COMP3 sensing the rise in the input voltage $V_{in}$ to above the reference voltage on the second input to comparator COMP3 on start-up, with the delay 26 delaying the operation of the control circuit for a time period adequate for the input voltage $V_{in}$ to reach its normal operating voltage and allowing the voltage of $V_{in}$ to settle, since a physical connection is used to plug a board in and the supplies will rattle around when the board is plugged in.

Other inputs to the control 24 of the exemplary embodiment include the outputs of comparator COMP4 and COMP5. Comparator COMP4 senses the output voltage $V_{out}$ and provides a signal to the control circuit 24 indicative of the output OVLO being above or below the voltage of the second input to comparator COMP4, in the preferred embodiment approximately 0.1 volts. Thus, comparator COMP4 senses the state of the output and provides an indication thereof to the control circuit 24. Comparator COMP5, on the other hand, may receive an externally generated ON signal which may be used, if desired, as an externally controllable enable signal, the logic level for this enable signal being determined by the voltage on the second input to the comparator, in the preferred embodiment, 0.6 volts. The ON signal, of course, if not used, may be strapped high so that the turn-on of the circuit will be controlled by comparator COMP3 sensing the presence or absence of $V_{in}$.

The operation of the exemplary embodiment of the present invention shown in FIG. 1 may be described as follows. The circuit may be initiated in either one of two ways, as previously mentioned. In particular, if the input ON is initially held low, the output of comparator COMP5 will hold the control 24 inactive, even though an input voltage $V_{in}$ is provided to the circuit. Then when the input ON is driven high to turn on the circuit, the operation of the control 24 will be initiated. Alternatively, the input ON may be strapped high, either by connecting the input to a fixed voltage representative of a logic high signal, or alternatively, by connecting the input ON to the $V_{in}$ terminal so that the input ON is driven to a high logic level whenever, in the embodiment shown, the input voltage $V_{in}$ is above 0.6 volts. In this manner, the presence of the supply voltage $V_{in}$, such as would suddenly occur during hot swapping of a board, would immediately provide a corresponding indication to the control 24. The rise of the voltage $V_{in}$ in this embodiment to a voltage above 2.45 volts will also provide an output of comparator COMP3, indicative of the presence of the input voltage $V_{in}$, though the delay of delay circuit 26 (150 nanoseconds in the exemplary embodiment) will delay the initiation of the control 24 sufficiently to allow the input voltage $V_{in}$ to reach its nominal value.

On initiation of the control 24, the control 24 is initially held in a startup mode for a time period determined in the exemplary embodiment by a time constant set by external capacitor CTON. When in the startup mode, the control 24 is not responsive to the output of comparator COMP1, but rather is responsive to the output of comparator COMP2. This comparator is a relatively fast comparator (having a relatively fast response or short response time with respect to COMP1) and sets the current limit during startup. When the output current (the current through resistor $R_{sense}$ and transistor Q1) reaches a preset value equal to THRESHOLD2/$R_{sense}$, the rate of rise of the gate voltage on transistor Q1 is regulated to keep the current substantially at that preset value as sensed by the output of comparator COMP2. Thus, the current limit on startup is set by comparator COMP2, the fast comparator. Since the fast comparator typically has a higher threshold voltage than comparator COMP1, a relatively slow comparator having a response time determined by external capacitor CSPD, the startup current can be higher than that sensed by the slow comparator COMP1. In the preferred embodiment, the slow comparator output is ignored during start-up.

Typically, the startup time, given the startup current limit set by use of the present invention and the requirements of the circuit driven thereby, will be a fixed startup time, or at least, be a predetermined maximum startup time. In the embodiment shown, the external capacitor CTON would be selected to provide a startup time to control 24 to somewhat exceed this maximum startup time to be experienced. The control 24 should not be held in the startup mode too long, however, as in many applications the startup current would be excessive as an operating current for a prolonged period of time, and accordingly, it may be relatively important to sense and limit the operating current shortly after normal operation has been reached to be sure that an extraordinary event (fault) is not occurring during normal operation.

While in the embodiment described with respect to FIG. 1, the time-out of the startup mode to effect the transition between the startup mode and the normal operating mode of the control 24 is determined by a timer controlled by external capacitor CTON, obviously other time control elements or methods might be used. As an alternative, a decrease in the output current, such as sensed by a decrease in the voltage drop across the resistor $R_{sense}$, might be used by the control 24 to trigger the transition between the startup and the normal operating modes, with a timer such as might be controlled by an external capacitor, such as capacitor CTON, being used as an override to trigger the transition in the event the current demanded by the output did not significantly decrease when startup otherwise would have been complete. This, however, is not preferred because it would require additional circuitry, and the circuit of FIG. 1 normally would be capable of tolerating an extended startup current which could occur as a result of a fault condition until the time-out of the startup mode.

For the exemplary embodiment illustrated in FIG. 1, when the startup timer times out, the control 24 switches to its normal operating mode. In this condition, the output of both comparators COMP1 and COMP2 are used as control signals for the control 24. In particular, the slow comparator COMP1 is used to monitor the steady state current, the relatively long time constant of the comparator preventing the same from responding to high frequency noise and very short term transients in the output current. Neglecting the high frequency components, when the output current exceeds the value determined by resistor $R_{sense}$ and Threshold 1, the control 24 turns off transistor Q1. Since only the steady state current limit has been exceeded, rather than the "never to exceed" current limit (measured by COMP2), the rate of turn off of transistor Q1 (due to a fault condition) may be purposely slowed to avoid substantial transients in the power supply and power supply lines supplying the input voltage $V_{in}$. For this purpose, an external capacitor CBOT may be provided, if desired. In the preferred embodiment, the slow comparator COMP will have a response time of approximately 20 microseconds or more and a threshold substantially below that of comparator COMP2.

Comparator COMP2 is used to monitor the peak current through resistor $R_{sense}$ and transistor Q1. When the peak current exceeds a predetermined value, as determined by the value of resistor $R_{sense}$ and Threshold 2 as previously described, the control 24 will respond to the output of fast comparator COMP2 to turn off transistor Q1. The fast comparator preferably has a response time on the order of 100 nanoseconds, and accordingly, catches fast transients. For that reason, its threshold is higher than that of the slow comparator COMP1. Since such transients have a peak value higher than the steady state current, it is highly preferable to have the current threshold of the fast comparator adjustable independently from the current threshold of the slow comparator, since the transients that one expects to see in a system vary from system to system. External adjustments of the characteristics of the integrated circuits allows tailoring of a fixed integrated circuit for optimal use in a variety of systems.

In the event the peak current as allowed by the fast comparator COMP2 is exceeded, the control 24 in the exemplary embodiment of FIG. 1 will provide a discharge signal to discharge the gate of transistor Q1 to turn the same off. At the same time, any extra capacitance added to the gate of transistor Q1 to slow its turn off rate when responding to a high steady state current may be disconnected to allow the fastest possible turn off of transistor Q1. This assures minimal effect, to the extent possible, of extraordinary current demands such as might be caused by short circuits and near short circuits. In any event, when control 24 turns off transistor Q1, another timer in the control 24, having a time constant set by external capacitor CTIM, is initiated. This timer, when it times out, will initiate a new startup cycle for control 24 so that in the case of temporary fault conditions, the system will automatically recover and become operative when the fault is corrected. As one simple example, a faulty peripheral device might be plugged into a board having the present invention current limiter thereon, causing the circuit breaker function of the present invention to shut down the circuit because of the extraordinary load thereon. The periodic restart feature, however, will allow the system to automatically recover after the faulty device is unplugged. In other applications, however, it may not be desired to have an automatic retry feature, in which case the feature may be omitted, or alternatively, an input such as the CTIM input to control 24 may be tied high or low as applicable to disable the automatic retry feature. Alternatively, a provision may be made for restart to be reinitiated, if desired, by pulsing the ON signal low and then back high. A still further embodiment may preset the time to retry to some multiple of the start time, such as 32 times the start time.

There has been described herein new and unique current monitors with independently adjustable dual level current thresholds which include various other features and capabilities. These various features and capabilities may be combined within a single device or used in various combinations or subcombinations, as desired, as the inclusion of all features in any embodiment of the invention is not required to obtain the benefits of the invention. In the specific circuit used in the preferred embodiment, during startup the gate drive provided to transistor Q1 is limited to 100 microamps, and may be made to decrease with the increase of the gate voltage of transistor Q1. Thus, the rate of increase of the gate voltage on transistor Q1 during startup may be controlled by the external capacitor CBOT. If, during startup, the fast comparator COMP2 detects an overcurrent, the gate drive is reversed so that the gate voltage is momentarily discharged with a fixed 100 microamp current until the load current through the sense resistor $R_{sense}$ decreases below the threshold level detected by comparator COMP2. This effectively regulates the turn on current during startup, either because of the limit on the rate of charging the gate circuit of transistor Q1 (the gate capacitance plus CBOT in the exemplary embodiment), or if that rate is too fast to keep the maximum startup current below the limit, by the momentary discharge of the gate circuit when the maximum startup current starts to exceed the intended limit. Alternatively, the rate of rise in the output voltage VOUT during normal startup may be limited to limit the expected start-up current to a value below the desired startup limit. This may be done such as by limiting, the rate of charging of the gate circuit of transistor Q1, with the circuit turning off transistor Q1, with or without automatic retry, if the allowable startup current is exceeded. Also in the preferred embodiment, if the slow comparator detects an overcurrent condition, the gate circuit of transistor Q1 is discharged with a current of 200 microamps so that the external capacitor CBOT again determines the rate of turn off of transistor Q1.

If desired, a status pin may be provided on the integrated circuit to provide an indication of the state of the current monitor, such as by way of example, having the status pin go low when a fault condition is encountered. As a further embodiment, the current monitor may couple a resistor between the output OUT and ground, such as a 1K resistor when transistor Q1 is turned off because of a fault, to discharge capacitor $C_O$. As a still further alternate embodiment, the threshold for the fast comparator may be set to some multiple of the threshold of the slow comparator, such as by way of example, four times the slower comparator, though greater flexibility is achieved by making these two thresholds independently settable.

It will be noted in the embodiment of FIG. 1 that the startup signal provided by comparator COMP3 and delay circuit 26 will not be provided until the input voltage $V_{in}$ reaches at least 2.45 volts. This protects the transistor Q1 from an insufficient gate drive voltage. In still another embodiment, comparator COMP4 provides a signal to the control 24 that prevents the control from restarting the circuit after a fault condition if the output voltage $V_{out}$ remains above 0.1 volts. Thus, various preferred and alternate embodiments of the present invention have been disclosed and described herein in detail as exemplary only and not for purposes of limitation. Thus, various changes in form and detail will be obvious to those skilled in the art, and may readily be applied to the present invention without departing from the spirit and scope of the invention.

What is claimed is:

1. A current monitor comprising:
    a semiconductor device having first and second electrodes and a control electrode for controlling the flow of current through the first and second electrodes;
    a first user selectable device in series with the first electrode and monitoring current through the first electrode;
    a first circuit coupled to the first user selectable device providing a first signal that indicates whether the current through the first user selectable device exceeds a first current limit, the first current limit being adjustable by the first user selectable device;
    a second user selectable device;
    a second circuit coupled to the first user selectable device and the second user selectable device, the second circuit providing a second signal that indicates whether the current through the first user selectable device exceeds a second current limit, the second current limit being controllable by the second user selectable device;
    a controller having a start-up mode and a normal operating mode, the controller being coupled to the first and second circuits and the control electrode, the controller during the start-up mode limiting the current through the first user selectable device to the second current limit, and during the normal operating mode, not limiting the current and controlling the control electrode to stop current flow through the semiconductor device if the current through the first user selectable device exceeds the first current limit.

2. The current monitor of claim 1 wherein the controller during the start-up mode limits the current through the first user selectable device to the second current limit by controlling the control electrode to stop current flow through the semiconductor device if the current through the first user selectable device reaches the first current limit.

3. The current monitor of claim 2 wherein the length of time the controller remains in the start-up mode is adjustable by a third user selected device.

4. The current monitor of claim 1 wherein the first circuit has a first time of response and the second circuit has a second time of response, the second time of response being substantially shorter than the first time of response.

5. The current monitor of claim 4 wherein the first time of response is adjustable by the selection of a third user selectable device.

6. The current monitor of claim 4 wherein the second current limit is greater than the first current limit.

7. The current monitor of claim 6 wherein during the normal operating mode, the control electrode is controlled to stop current flow through the semiconductor device if the current through the first user selectable device exceeds either the first current limit or the second current limit.

8. The current monitor of claim 2 wherein the controller includes an automatic retry mode reinitiating the startup mode a period of time after controlling the control electrode to stop current flow through the semiconductor device if the current through the first user selectable device exceeds the first current limit or the second current limit.

9. The current monitor of claim 8 wherein the period of time is user adjustable by a third user selectable device.

10. The current monitor of claim 9 wherein the third user selectable device is a capacitor.

11. The current monitor of claim 1 wherein the first and second user selectable devices are resistors.

12. The current monitor of claim 1 wherein the semiconductor device is a MOS transistor, the first electrode is a drain, the second electrode is a source and the control electrode is a gate.

13. The current monitor of claim 12 wherein the first user selectable device is coupled to a power supply voltage, and further comprised of a gate drive charge pump providing a controllable gate drive voltage exceeding the power supply voltage.

14. A current monitor comprising:
    a semiconductor device having first and second electrodes and a control electrode for controlling the flow of current through the first and second electrodes;
    a first user selectable device in series with the first electrode and monitoring current through the first electrode;
    a second user selectable device;
    an integrated circuit having:
        a first circuit coupled to the first user selectable device providing a first signal that indicates whether the current through the first user selectable device exceeds a first current limit, the first current limit being adjustable by the first user selectable device;
        a second circuit coupled to the first user selectable device and the second user selectable device, the second circuit providing a second signal that indicates whether the current through the first user selectable device exceeds a second current limit, the second current limit being controllable by the second user selectable device;
        a controller having a start-up mode and a normal operating mode, the controller being coupled to the first and second circuits and the control electrode, the controller during the start-up mode limiting the current through the first user selectable device to the second current limit, and during the normal operating mode, controlling the control electrode to stop current flow through the semiconductor device if the current through the first user selectable device exceeds the first current limit.

15. The current monitor of claim 14 wherein the controller during the start-up mode limits the current through the first user selectable device to the second current limit by controlling the control electrode to stop current flow through the semiconductor device if the current through the first user selectable device reaches the first current limit.

16. The current monitor of claim 15 wherein the length of time the controller remains in the start-up mode is adjustable by a third user selected device.

17. The current monitor of claim 14 wherein the first circuit has a first time of response and the second circuit has a second time of response, the second time of response being substantially shorter than the first time of response.

18. The current monitor of claim 17 wherein the first time of response is adjustable by the selection of a third user selectable device.

19. The current monitor of claim 17 wherein the second current limit is greater than the first current limit.

20. The current monitor of claim 19 wherein during the normal operating mode, the control electrode is controlled to stop current flow through the semiconductor device if the current through the first user selectable device exceeds either the first current limit or the second current limit.

21. The current monitor of claim 15 wherein the controller includes an automatic retry mode reinitiating the startup mode a period of time after controlling the control electrode to stop current flow through the semiconductor device if the current through the first user selectable device exceeds the first current limit or the second current limit.

22. The current monitor of claim 21 wherein the period of time is user adjustable by a third user selectable device.

23. The current monitor of claim 22 wherein the third user selectable device is a capacitor.

24. The current monitor of claim 14 wherein the first and second user selectable devices are resistors.

25. The current monitor of claim 14 wherein the semiconductor device is a MOS transistor, the first electrode is a drain, the second electrode is a source and the control electrode is a gate.

26. The current monitor of claim 25 wherein the first user selectable device is coupled to a power supply voltage, and wherein the integrated circuit is further comprised of a gate drive charge pump providing a controllable gate drive voltage exceeding the power supply voltage.

27. An integrated circuit being part of a current monitor having a semiconductor device having first and second electrodes and a control electrode for controlling the flow of current through the first and second electrodes, a first user selectable device in series with the first electrode and monitoring current through the first electrode, and a second user selectable device, the integrated circuit comprising:

a first circuit coupled to at least one of the user selectable devices providing a first signal that indicates whether the current through the first user selectable device exceeds a first current limit, the first current limit being adjustable by selection of at least one of the user selectable devices;

a second circuit coupled to the first user selectable device, the second circuit providing a second signal that indicates whether the current through the first user selectable device exceeds a second current limit, the second current limit being controllable by selection of at least one of the user selectable devices;

a controller having a start-up mode and a normal operating mode, the controller being coupled to the first and second circuits and the control electrode, the controller during the start-up mode limiting the current through the first user selectable device to the second current limit, and during the normal operating mode, controlling the control electrode to stop current flow through the semiconductor device if the current through the first user selectable device exceeds the first current limit.

28. The integrated circuit of claim 27 wherein the controller during the start-up mode limits the current through the first user selectable device to the second current limit by controlling the control electrode to stop current flow through the semiconductor device if the current through the first user selectable device reaches the first current limit.

29. The integrated circuit of claim 28 wherein the length of time the controller remains in the start-up mode is adjustable by a third user selected device.

30. The integrated circuit of claim 27 wherein the first circuit has a first time of response and the second circuit has a second time of response, the second time of response being substantially shorter than the first time of response.

31. The integrated circuit of claim 30 wherein the first time of response is adjustable by the selection of a third user selectable device.

32. The integrated circuit of claim 30 wherein the second current limit is greater than the first current limit.

33. The integrated circuit of claim 32 wherein during the normal operating mode, the control electrode is controlled to stop current flow through the semiconductor device if the current through the first user selectable device exceeds either the first current limit or the second current limit.

34. The integrated circuit of claim 28 wherein the controller includes an automatic retry mode reinitiating the startup mode a period of time after controlling the control electrode to stop current flow through the semiconductor device if the current through the first user selectable device exceeds the first current limit or the second current limit.

35. The integrated circuit of claim 34 wherein the period of time is user adjustable by a third user selectable device.

36. The integrated circuit of claim 35 wherein the third user selectable device is a capacitor.

37. The integrated circuit of claim 27 wherein the first and second user selectable devices are resistors.

38. The integrated circuit of claim 27 wherein the semiconductor device is a MOS transistor, the first electrode is a drain, the second electrode is a source and the control electrode is a gate.

39. The integrated circuit of claim 38 wherein the first user selectable device is coupled to a power supply voltage, and wherein the integrated circuit is further comprised of a gate drive charge pump providing a controllable gate drive voltage exceeding the power supply voltage.

* * * * *